United States Patent
Kwon et al.

(10) Patent No.: US 9,244,288 B2
(45) Date of Patent: Jan. 26, 2016

(54) PATTERNED RETARDER TYPE 3D DISPLAY HAVING IRREGULAR PATTERN BLACK STRIPS

(71) Applicant: LG DISPLAY CO., LTD., Seoul (KR)

(72) Inventors: Taewook Kwon, Paju-si (KR); Hasuk Kang, Paju-si (KR); Cheolwoo Park, Goyang-si (KR); Chulsang Shin, Paju-si (KR); Seokho Shim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 166 days.

(21) Appl. No.: 13/718,843

(22) Filed: Dec. 18, 2012

(65) Prior Publication Data

US 2013/0155506 A1    Jun. 20, 2013

(30) Foreign Application Priority Data

Dec. 19, 2011 (KR) .......... 10-2011-0137047

(51) Int. Cl.
   *G02B 27/26*    (2006.01)
   *G02B 27/22*    (2006.01)
   *G02B 5/22*     (2006.01)
   *H04N 13/04*    (2006.01)
   *G02F 1/1335*   (2006.01)
   *G02F 1/13363*  (2006.01)

(52) U.S. Cl.
   CPC .......... *G02B 27/26* (2013.01); *G02F 1/133512* (2013.01); *H04N 13/0422* (2013.01); *H04N 13/0434* (2013.01); *G02F 2001/133631* (2013.01); *H04N 2213/001* (2013.01)

(58) Field of Classification Search
   None
   See application file for complete search history.

(56) References Cited

U.S. PATENT DOCUMENTS

2010/0289884 A1*  11/2010  Kang ............................. 348/58

FOREIGN PATENT DOCUMENTS

| JP | 2011180557 A |   | 9/2011 |
| JP | 2011180557 A | * | 9/2011 |

OTHER PUBLICATIONS

Korean Office Action for Application No. 10-2011-00137047 dated Mar. 28, 2014 (no translation).

* cited by examiner

*Primary Examiner* — Jade R Chwasz
(74) *Attorney, Agent, or Firm* — Birch, Stewart, Kolasch & Birch, LLP

(57) ABSTRACT

A patterned retarder type 3D display includes a display panel including a plurality of unit pixels disposed in a matrix manner and a black matrix, a patterned retarder including a plurality of unit retarder patterns disposed at every row of the plurality of the unit pixels and located in front of the display panel, and a black strip including a main strip disposed as to be overlapped with the black matrix, the black strip being disposed between two unit pixels neighboring in a vertical direction and having a width expanded in any one direction of an upside direction and a down side direction from a border line of the unit retarder pattern, wherein outer lines of the black strips disposed at the each unit pixel are irregularly disposed, wherein the main strip extends in a horizontal direction.

11 Claims, 6 Drawing Sheets

PATTERNED RETARDER TYPE 3D DISPLAY HAVING IRREGULAR PATTERN BLACK STRIPS

This application claims the benefit of Korean Patent Application No. 10-2011-0137047 filed on Dec. 19, 2011, which is incorporated herein by reference for all purposes as if fully set forth herein.

BACKGROUND OF THE INVENTION

1. Field of the Invention

The present disclosure relates to a patterned retarder type display having black strips irregularly disposed. Especially, the present disclosure relates to a patterned retarder type 3D display having irregular patterned black strips for eliminating the moiré problem caused by the I-type black strip array.

2. Discussion of the Related Art

Recently, thank to the advancement of the various video contents, the display devices which can selectively reproduce 2D images and 3D images are actively developed. For reproducing the 3D images, the display uses the stereoscopic technique or the autostereoscopic technique.

As one example of the glasses type, there is a 3D display device having a patterned retarder on the display panel. This 3D display device represents the 3D images using the polarization characteristics of the patterned retarder and the polarization glasses. Therefore, there is no cross-talk problem between the left eye image and the right eye image, and it ensure brighter luminescent so that the quality of the image is better than other type of 3D display device.

FIG. 1 is the perspective view illustrating the structure of a 3D display system having a patterned retarder according to the related art. The patterned retarder type 3D display system represents the 3D images using the polarization characteristics of the patterned retarder PR disposed on the display panel DP and those of the polarization glasses PG used by the observer.

Referring to FIG. 1, the patterned retarder type 3D display system includes a display panel DP representing 2D image or 3D image, a patterned retarder PR attached on the front surface of the display panel DP, and polarization glasses PG.

The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and the common electrode. Each liquid crystal cell is driven by the electric field formed between the pixel electrode connected to the thin film transistor and the common electrode. Each inside surface of the upper glass substrate SU and the lower glass substrate SL has an alignment layer, respectively for setting up the pre tilt angle of the liquid crystal. Each outside surface of the upper glass substrate SU and the lower glass substrate SL has the upper polarization film PU and the lower polarization film PL, respectively.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with $+\lambda/4$ (here, '$\lambda$' is the wavelength of the light incident from the pixel array). The second retarder RT2 can transmit the second circular polarized light by retarding the phase of the light with $-\lambda/4$ (actually, $+3\lambda/4$). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprises a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 1, by setting the polarized light characteristic of the left eye images different from that of the right eye images, the left eye image and the right eye images can be separately reached to the observer's left eye and right eye, respectively.

In the 3D display device having the film patterned retarder, as the left eye image and the right eye image are alternatively represented in the unit of pixel row, there are some cross-talk problems at the wide view angle along to the up-down directions. FIG. 2 is a cross sectional view along the cutting line A-A' in FIG. 1 illustrating that the cross-talk problem occurring at the 3D display device as shown in FIG. 1.

Referring to FIG. 2, when observing the video data at upper side (or lower side) than the straight front direction, the left eye image L1 and the right eye image R1 can transmit through the first patterned retarder RT1, at the same time. As a result, the cross-talk problem is occurred in which the left eye image L1 and the right eye image R1 pass through the left glass window LG of the polarization glasses PG, at the same time. Even though, there is a black matrix BM at the border between the pixels in horizontal units, the black matrix BM does not have enough width to prevent the cross-talk problem.

In order to solve this cross-talk problem in the vertical view angle direction, there is a method in which a black strip is added between two unit patterned retarders. FIG. 3 is the cross-sectional view illustrating the 3D display in which a black strip is further included for solving the cross-talk problem caused in the device shown in FIG. 2.

Referring to FIG. 3, on the outer surface of the upper substrate UP having the black matrix BM, a black strip BS is disposed as to be overlapped with the black matrix BM. On the light path at which the right eye images R1 passes through the first retarder RT1, a black matrix BM is disposed so that the right eye image R1 passing through the first retarder RT1 can be blocked. Therefore, when an observer located at the straight front of the display device moves up side or down side somewhat, the cross-talk problems are not occurred. However, in this structure, in order to prevent the cross-talk problem more effectively, the black matrix BM should have remarkably wider width. As the width of the black matrix BM is getting wider, the aperture ratio at the front direction is getting lowered and then the brightness may be degraded or the correct color cannot be represented.

Especially, by forming the width of the black strip BS having wider width than that of the black matrix BM and disposing the black strip BS to completely overlap the black matrix BM, it is possible to effectively solve the cross-talk problem in a wider vertical view angle range. However, when an observer move vertically up and down, around the critical position where the 3D cross-talk problem is not yet caused, the moiré phenomenon may be caused. Thus moiré is an optical pattern shown near the view angle border region in condition that the black strip BS is disposed in horizontal direction with linearly straight shape, and the edge line of the black strip is just overlapped with the border line of the patterned retarder. This moiré phenomenon is not caused in every 3D display in every case, but temporarily shown when an observer changes his/her position of viewing angle. Therefore, it may cause an optical illusion or it is acknowledged as the incorrect images by the observers.

SUMMARY OF THE INVENTION

In order to overcome the above mentioned drawbacks, the purpose of the present disclosure is to suggest a patterned retarder type 3D display having a black strip to enhance the view angle and to prevent the moiré phenomenon caused by the black strip pattern. Another purpose of the present disclosure is to suggest a patterned retarder type 3D display in which the 3D cross-talk problem is solved without reducing of the aperture ratio and the front brightness, and the moiré phenomenon caused by the regularly linear strip type is also solved.

In order to accomplish the above purpose, the present disclosure suggests a patterned retarder type 3D display comprising: a display panel including a plurality of unit pixels disposed in a matrix manner; a patterned retarder including a plurality of unit retarder pattern disposed at every row of the plurality of the unit pixels and located in front of the display panel; and a black strip disposed between two unit pixels neighboring in vertical direction and a width expanded any one direction of a upside direction and a down side direction from a border line of the unit retarder pattern, wherein outer lines of the black strips disposed at the each unit pixel are irregularly disposed.

The outlines of the black strips disposed at unit pixels are shifted up and down with a predetermined distance.

The predetermined distance is any one value from 10% to 25% of a width of the black strip.

The one outer line of the one black strip disposed at the one unit pixel is shifted up and down with a predetermined distance from the other outer line of the other black strip disposed at any one unit pixel of left side unit pixel and right side unit pixel.

The predetermined distance is any one value from 10% to 25% of a width of the black strip.

Any one outer line of the black strip disposed at any one unit pixel among following three pixels is shifted up and down with a predetermined distance from other two outer line of the black strips disposed at other unit pixels.

The predetermined distance is any one value from 10% to 25% of a width of the black strip.

The black strip has a first width and is linearly disposed over all horizontally neighboring unit pixels; further comprises: an auxiliary black strip having a second width and disposed at one side from the black strip within one unit pixel.

Any one unit pixel among following three unit pixels has the auxiliary black strip disposed at up side of the unit pixel, and the other pixels have the auxiliary black strip disposed at down side of the unit pixels.

Any one unit pixel has the auxiliary black strip disposed at upside, and any one neighboring unit pixel has the auxiliary black strip disposed at down side.

The second width is less than 5% of a vertical length of the unit pixel.

The second width is any one value from 10% to 25% of the first width.

The patterned retarder type 3D display according to the present disclosure comprises a black strip having an irregular pattern disposed between unit patterned retarder for preventing the 3D cross-talk problem. Therefore, the present disclosure can suggest an effect for preventing the moiré phenomenon caused by that the same and regular shaped patterns are disposed continuously and repeatedly. The black strips are irregularly disposed in which two neighboring black strips allocated at two neighboring unit pixels, respectively, are mis-aligned. Therefore, the 3D cross-talk can be solved without reducing of the aperture ratio and the front luminescence (or brightness), and the moiré phenomenon due to regular horizontal pattern can be also prevented to get an excellent quality of the 3D display.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
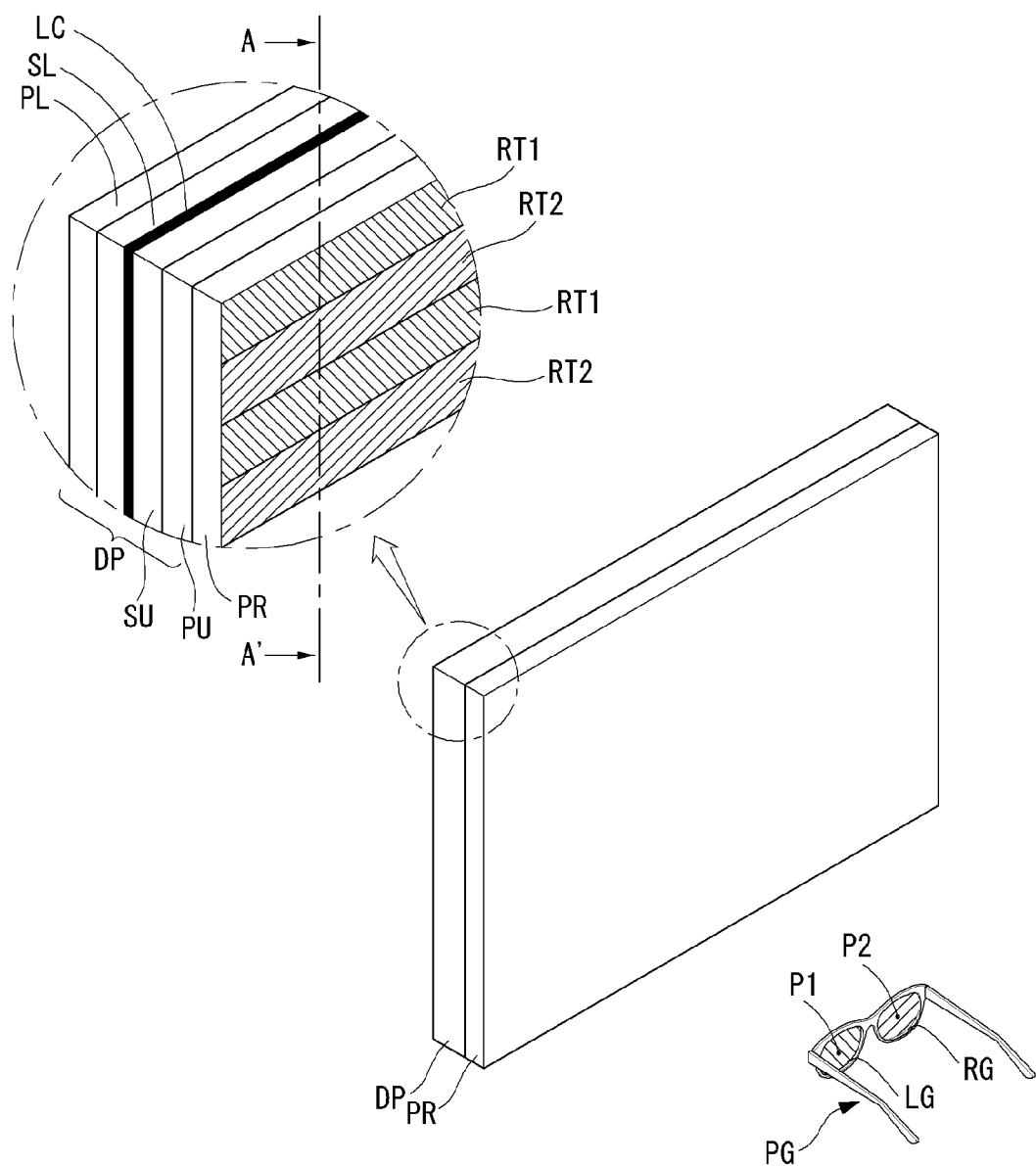
FIG. 1 is the perspective view illustrating the structure of a 3D display system having a patterned retarder according to the related art.
Figure 2:
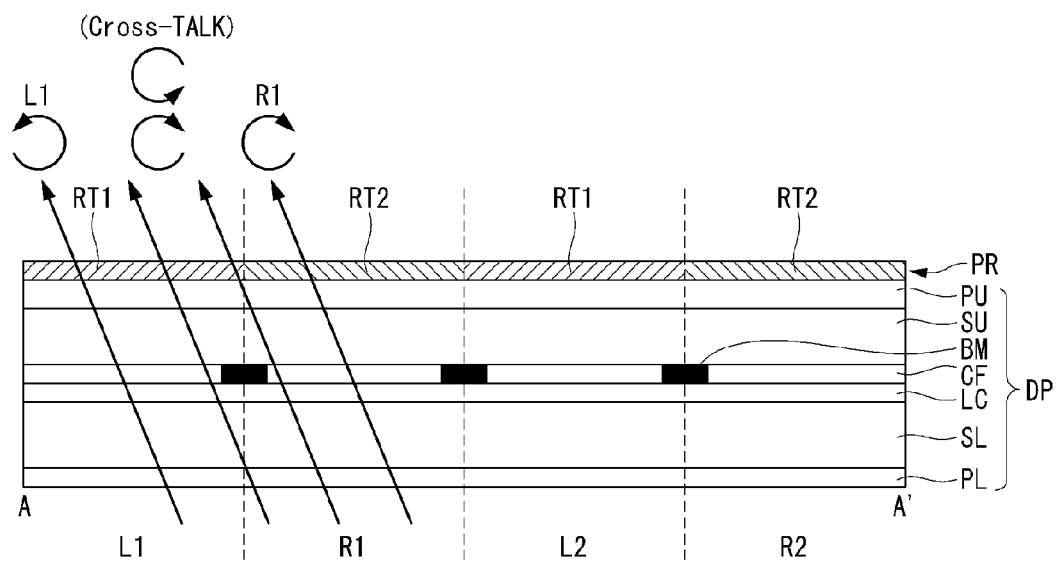
FIG. 2 is a cross sectional view along the cutting line A-A' in FIG. 1 illustrating that the cross-talk problem occurring at the 3D display device as shown in FIG. 1.
Figure 3:
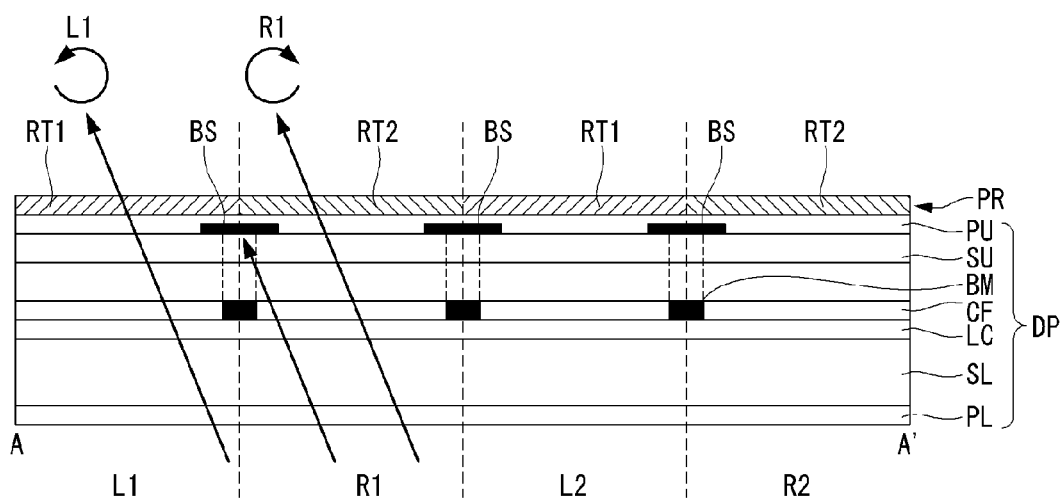
FIG. 3 is the cross-sectional view illustrating the 3D display in which a black strip is further included for solving the cross-talk problem caused in the device shown in FIG. 2.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 4:
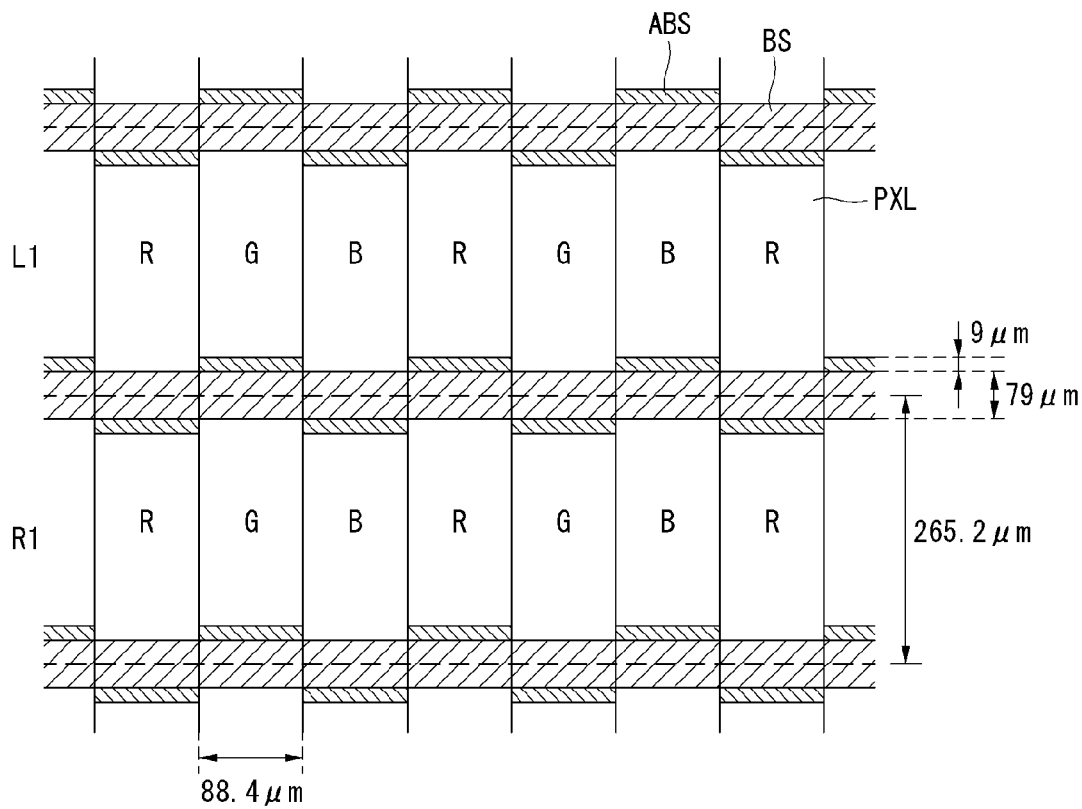
FIG. 4 is a front view illustrating the structure of a patterned retarder type 3D display system having the first array example of the black strip, according to the first embodiment of the present disclosure.
Figure 5:
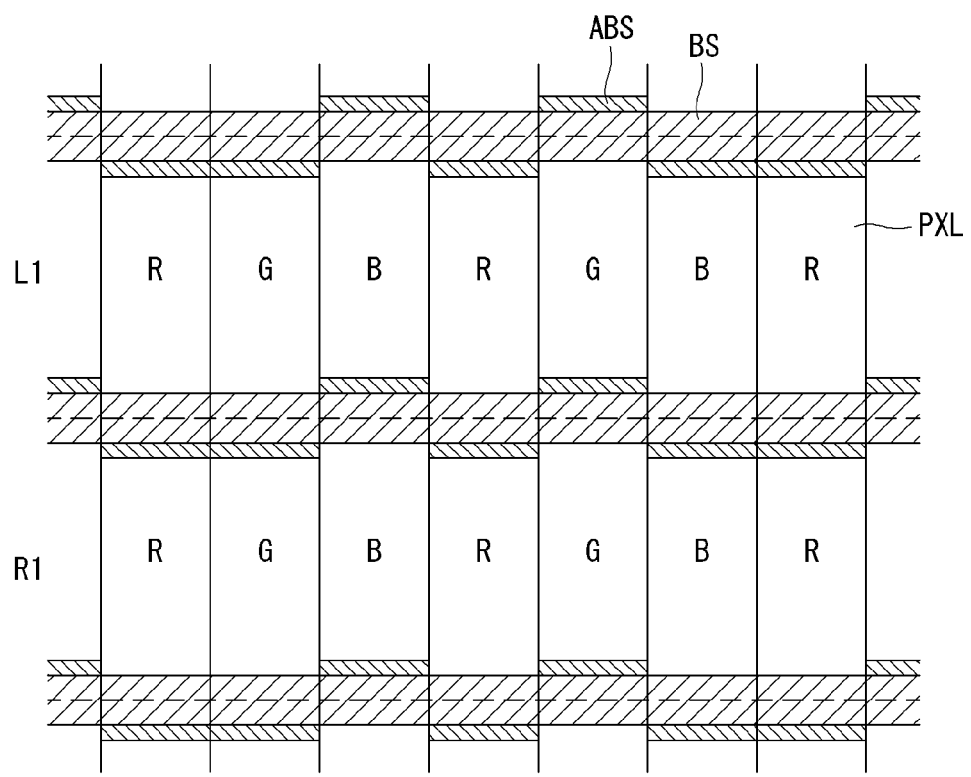
FIG. 5 is a front view illustrating the structure of a patterned retarder type 3D display system having the second array example of the black strip, according to the first embodiment of the present disclosure.

Hereinafter, referring to FIGS. 4 to 7, we will explain various embodiments according to the present disclosure. Firstly, referring to FIGS. 4 and 5, we will explain about the first embodiment of the present disclosure. FIG. 4 is a front view illustrating the structure of a patterned retarder type 3D display system having the first array example of the black strips, according to the first embodiment of the present disclosure. FIG. 5 is a front view illustrating the structure of a patterned retarder type 3D display system having the second array example of the black strips, according to the first embodiment of the present disclosure.

Referring to FIG. 4, when seeing the 3D display system according to the first embodiment of the present disclosure, the unit pixels PXL are disposed in horizontal direction as Red-Green-Blue (R-G-B) pattern. With each horizontal series of unit pixels PXL, the left eye image and the right eye image are alternatively represented. For example, the first pixel row is allocated to represent the first left eye image L1, and the second pixel row is allocated to represent the first right eye image R1. Further, the third pixel row is allocated to represent the second left eye image L2, and the fourth pixel row is allocated to represent the second right eye image R2.

For the left eye image L1, the left eye retarder pattern is disposed, and for the right eye image R1, the right eye retarder pattern is disposed. Further, between the left eye retarder and the right eye retarder, a black strip BS is disposed. In figure, as the unit patterned retarder (i.e., one left eye retarder or one right eye retarder) is perfectly overlapped with the pixel row when seeing from the front direction, only pixel PXL arrays are illustrated in convenience. Further, as the main feature of the present disclosure is on the black strip disposed between the left eye retarder and the right eye retarder, the detail explanation for the patterned retarder and the unit patterned retarder pattern will not be mentioned.

The sizes of the black strip BS are various depending on the sizes of the 3D display systems. For example, for the case that the size of the unit pixel PXL is 88.4 um in horizontal width with 265.2 um in vertical length, when considering the vertical view angle and the aperture ratio, it is preferable that the vertical width of the black strip BS is 79 um (micrometer).

The black strip BS having 79 um width is running to horizontal direction on the display panel with linear pattern. This continuous linear pattern of the black strip BS may cause the moiré phenomenon. In order to prevent from causing the moiré phenomenon, an auxiliary black strip ABS which occupies some portion of the vertically neighboring pixel PXL may be formed with the black strip BS.

More preferably, the auxiliary black strips ABS are disposed as the manner in which two neighboring auxiliary black strips ABS are disposed at different vertical sides. For example, when any one pixel PXL in the first left eye row L1 has an auxiliary black strip ABS at the upper side, then left and right side pixels PXL have the auxiliary black strips ABS at the bottom sides of the pixels. Important thing is that the auxiliary black strips ABS are disposed in each pixel PXL as to have zigzag array pattern along the black strip BS.

As shown in FIG. 4, as each unit pixel PXL has an auxiliary black strip ABS on the upper side or bottom side adding to the black strip BS, in the aspect of one pixel area, the aperture ratio may be reduced by the auxiliary black strip ABS. In order to eliminate the moiré phenomenon and not to reduce the aperture ratio by the auxiliary black strip ABS, the vertical width of the auxiliary black strip ABS should not be over 5% of the vertical length of the pixel PXL. For example, when the unit pixel PXL has the width of 88.4 um and the length of 265.2 um and the width of the black strip BS is 79 um, it is preferable that the width of the black strip ABS is about 9 um.

The main purpose of the auxiliary black strip is to prevent the outer line of the black strip BS from being aligned with (i.e. linearly continuous with) that of the neighboring black strips BS. Therefore, in order to break down the linearity of the edge of the black strip BS covering all horizontal pixels, the width of the auxiliary black strip ABS should have certain vertical width value. The 9 um width of the auxiliary black strip ABS is relative width to the pixel length for considering the aperture ratio of the unit pixel PXL. However, it is required to get the width of the auxiliary black strip ABS relating to the width of the black strip BS for considering the elimination of moiré. In that case, it is preferable that the width of the auxiliary black strip ABS is more than 10% of that of the black strip BS. If the width of the auxiliary black strip ABS is too wide, then the aperture ratio would be reduced so much. Therefore, it is preferable that the width of the auxiliary black strip ABS should be less than 25% of the black strip width.

As shown in FIG. 4, the first array example of the black strip according to the first embodiment of the present disclosure has also regular array pattern, in which the auxiliary black strips are regularly up and down along the total length of the black strip. With regular pattern like this, the moiré phenomenon may not be eliminated perfectly. As the moiré is the optical pattern caused by the repetition of the regular pattern, the important feature is that any regularity should be demolished.

Now, we will explain about another example in which the regularity of the black strip edge line is more demolished, in the first embodiment of the present disclosure. The second array example of the black strip according to the first embodiment of the present disclosure has auxiliary black strips ABS occupied at upper side or bottom side of the unit pixel PXL irregularly or randomly. In this case, it is important that three following auxiliary black strips ABS disposed at three neighboring unit pixels PXL are not positioned at the same side continually. That is, when the auxiliary black strip ABS of a unit pixel PXL is disposed at the upper side, then any one unit pixel PXL of the left side pixel and the right side pixel has the auxiliary black strip ABS disposed at the bottom side.

As the second array example of the black strip according to the first embodiment of the present disclosure can break down the regularity of the array of the black strip more than the first array example, the moiré phenomenon can be more effectively eliminated. In the first embodiment, the arrangements of the auxiliary black strips are considered with the three neighboring unit pixels as a base. However, the auxiliary black strip ABS is for eliminating the moiré phenomenon, so the condition may be varied according to the pixel size or specification. That is, if required in the configuration of the display system, the auxiliary black strips ABS may be disposed at the same positions in the three neighboring pixels or in the four neighboring pixels.

Figure 6:
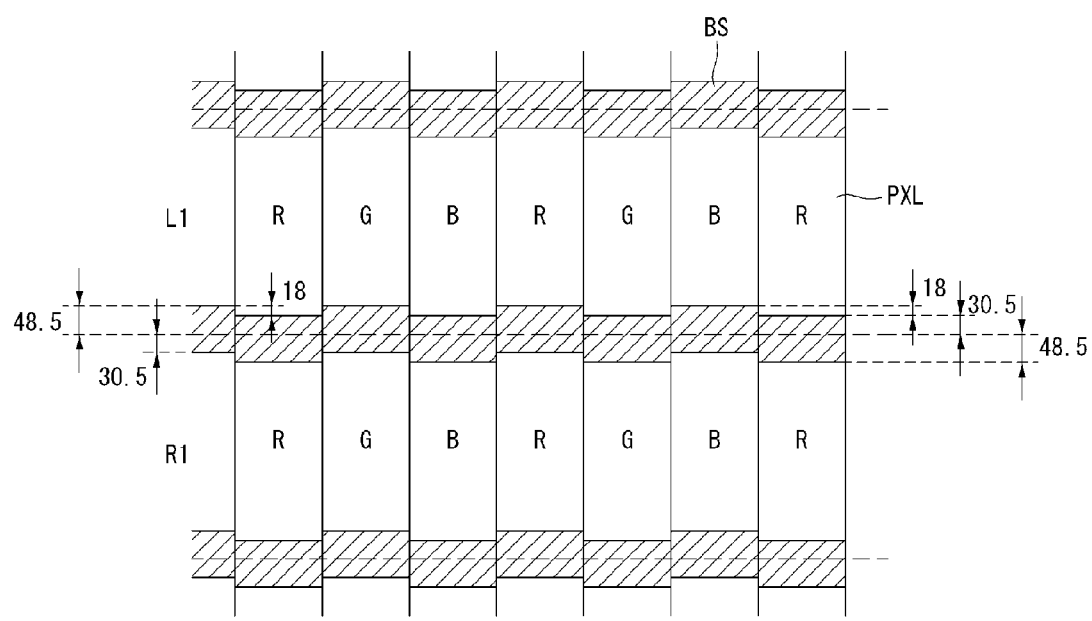
FIG. 6 is a front view illustrating the structure of a patterned retarder type 3D display system having the first array example of the black strips, according to the second embodiment of the present disclosure.
Figure 7:
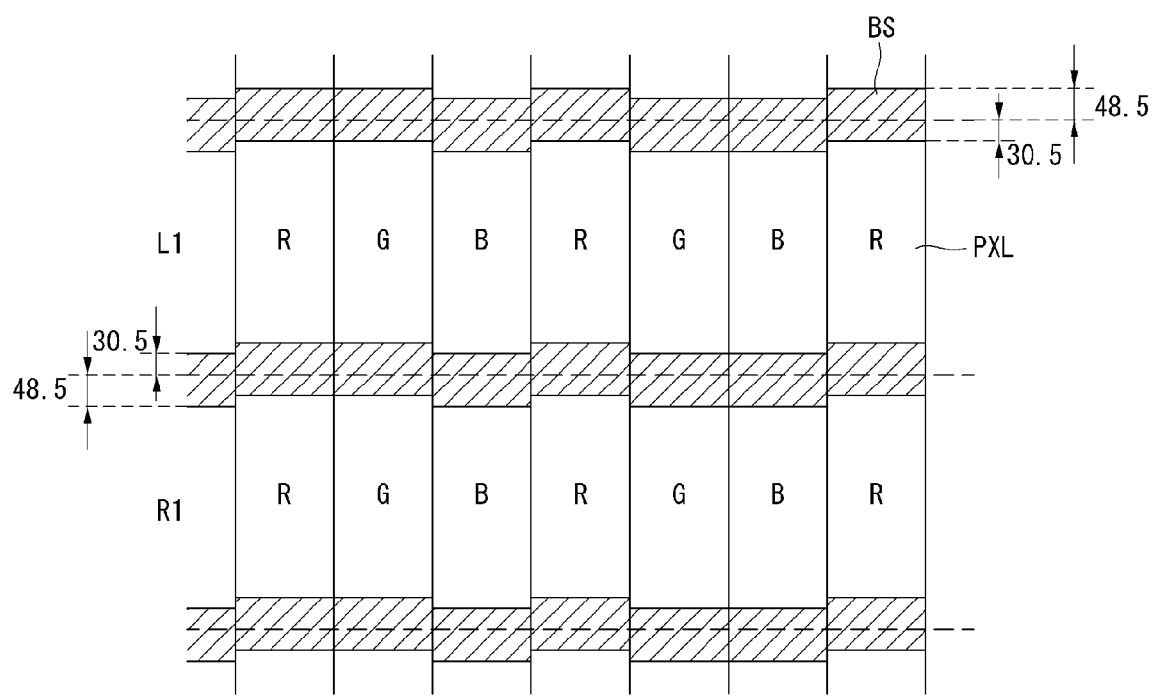
FIG. 7 is a front view illustrating the structure of a patterned retarder type 3D display system having the second array example of the black strips, according to the first embodiment of the present disclosure.

According to the first embodiment, the auxiliary black strip ABS is added for minimizing the reduction of the aperture ratio and for eliminating the moiré phenomenon. However, the aperture ratio should be reduced with little %, even if the reduction is minimized. In order to perfectly prevent the aperture ratio from being reduced, the black strip BS can be disposed at different position at each pixel. Hereinafter, referring to FIGS. 6 and 7, we will explain about the second embodiment of the present disclosure. FIG. 6 is a front view illustrating the structure of a patterned retarder type 3D display system having the first array example of the black strips, according to the second embodiment of the present disclosure. FIG. 7 is a front view illustrating the structure of a patterned retarder type 3D display system having the second array example of the black strips, according to the first embodiment of the present disclosure.

Referring to FIG. 6, the second embodiment of the present disclosure, the black strip BS of each unit pixel PXL is shiftily disposed to the up side or to the down side with a predetermined distance. For example, in any one unit pixel PXL, when the black strip BS is shifted to down side with a predetermined length from the border line of the unit patterned retarders, then, in the other pixels neighboring at the right side or the left side, the black strips BS are shifted to up side with a predetermined length from the border line of the unit patterned retarders. That is, each black strip BS disposed at each unit pixel PXL is arrayed in zig-zag pattern.

In more detail, two black strips BS disposed at the upper side and at the bottom side of one unit pixel PXL are shifted to lower direction with 9 um from the border line of the unit patterned retarder. In this case, the black strips BS disposed at the upper side and the bottom side of the unit pixel at the right side or at the left side are shifted to upper direction with 9 um from the border line of the unit patterned retarder. As a result, the neighboring black strips BS are disposed in zig-zag pattern in which they are misaligned with 18 um difference.

As mentioned in the first embodiment, when it is enough that the misalignment amount of the neighboring black strips BS is 9 um, then the black strip BS may be shifted to the up side or to down side with 4 um or 5 um from the border of the unit patterned retarder. Further, in order to break down the regularity, the black strip BS of the first pixel PXL may be shifted to up side with 4 um, the black strip BS of the second pixel PXL may be shifted to down side with 5 um, the black strip BS of the third pixel PXL may be shifted to down side with 4 um, and the black strip BS of the fourth pixel PXL may be shifted to up side with 5 um.

In the second embodiment of the present disclosure, the black strip BS cannot effect on the size of the pixel PXL and can be disposed with irregular pattern. Therefore, the aperture ratio and the front luminescence are not reduced at all, and the moiré phenomenon can be perfectly eliminated.

Furthermore, like the first embodiment, the zig-zag arrangement may have the regular pattern in overall view point. In order to demolish the regularity more and more, as shown in FIG. 7, with following three unit pixel PXL, the black strips BS may not be shifted to the same direction continually. That is, when the black strip BS of one unit pixel PXL is shifted to the up side direction, then any one unit pixel PXL of the left side pixel and the right side pixel has the black strip BS shifted to the down side direction.

The black strip BS according to the second embodiment does not effect on the aperture ratio of the unit pixel PXL anymore. Therefore, the only thing for considering is that the misaligned distance between the edge lines of the neighboring black strips BS should be ensured for eliminating the moiré phenomenon effectively. The misaligned distance between the edge lines of the neighboring black strips BS can be preferably selected in the range from 10% to 25% of the width of the black strip BS.

There are two embodiments in the present disclosure mainly. In the first embodiment, an auxiliary black strip ABS is added to the black strip BS, and in the second embodiment, the black strips BS are shifted without any auxiliary black strip ABS. These two embodiments have each merit and demerit, respectively. Therefore, any one embodiment can be selected for the case that the merit can be more required than others.

For example, for the first embodiment, the aperture ratios may be reduced in a little, but the black strip BS is disposed at the border line between two unit patterned retarder, so that it is possible to ensure the wide viewing angle for preventing the 3D cross-talk. Therefore, for the case in which the wider viewing angle is important but the front brightness is not so important, for example, notebook computer or personal terminal, the first embodiment may be better than the second embodiment.

On the other hand, for the second embodiment, the aperture ratio is not be reduced any more, but the 3D cross-talk may be degraded because the black strips BS are shifted to any one side. Therefore, for the case that the viewing angle of the observer is not changed so much but the front brightness is important, for example, large TV set, the second embodiment may be better than the first embodiment.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A 3D display comprising:
    a display panel including a plurality of unit pixels disposed in a matrix manner and a black matrix;
    a patterned retarder including a plurality of unit retarder patterns disposed at every row of the plurality of the unit pixels and located in front of the display panel; and
    a black strip including a main strip, the black strip being disposed between two unit pixels neighboring in a vertical direction and having a width expanded in any one direction of an upside direction and a down side direction from a border line of the unit retarder pattern, wherein outer lines of the black strips disposed at the each unit pixel are irregularly disposed, wherein the main strip extends in a horizontal direction, and wherein the main strip has a first width and is linearly disposed over all horizontally neighboring unit pixels, and the black strip further comprises an auxiliary strip having a second width smaller than the first width, the auxiliary strip protruding from one side of the main strip in an alternate manner to prevent the outer line of the black strip from being linearly continuous with that of neighboring black strips.

2. The 3D display according to claim 1, wherein outlines of the main strips disposed at unit pixels are shifted up and down with a predetermined distance.

3. The 3D display according to claim 2, wherein the predetermined distance is any one value from 10% to 25% of a width of the main strip.

4. The 3D display according to claim 1, wherein one outer line of one main strip disposed at one unit pixel is shifted up and down with a predetermined distance from the other outer line of the other main strip disposed at any one unit pixel of left side unit pixel and right side unit pixel.

5. The 3D display according to claim 4, wherein the predetermined distance is any one value from 10% to 25% of a width of the main strip.

6. The 3D display according to claim 1, wherein any one outer line of the main strip disposed at any one unit pixel among following three pixels is shifted up and down with a predetermined distance from other two outer line of the main strips disposed at other unit pixels.

7. The 3D display according to claim 6, wherein the predetermined distance is any one value from 10% to 25% of a width of the main strip.

8. The 3D display according to claim 1, wherein at least one auxiliary strip is disposed at up side of at least one unit pixel among following three unit pixels, and is disposed at down side of the other unit pixels of the three unit pixels.

9. The 3D display according to claim 1, wherein the auxiliary strip extends in the same direction as the main strip.

10. The 3D display according to claim 1, wherein the second width is less than 5% of a vertical length of the unit pixel.

11. The 3D display according to claim 1, wherein the second width is any one value from 10% to 25% of the first width.

* * * * *